(12) United States Patent
Patrick (10) Patent No.: US 12,299,437 B2
(45) Date of Patent: May 13, 2025

(54) METHOD AND SYSTEM FOR UPDATING CONFIGURATION SETTINGS DURING THE EXECUTION OF AN APPLICATION

(71) Applicant: Salesforce, Inc., San Francisco, CA (US)

(72) Inventor: Christina Martin Patrick, Tampa, FL (US)

(73) Assignee: Salesforce, Inc., San Francisco, CA (US)

( * ) Notice: Subject to any disclaimer, the term of this patent is extended or adjusted under 35 U.S.C. 154(b) by 236 days.

(21) Appl. No.: 16/934,846

(22) Filed: Jul. 21, 2020

(65) Prior Publication Data

US 2022/0027146 A1 Jan. 27, 2022

(51) Int. Cl.
*G06F 8/71* (2018.01)
*G06F 8/656* (2018.01)
*G06F 9/445* (2018.01)

(52) U.S. Cl.
CPC ............... *G06F 8/71* (2013.01); *G06F 8/656* (2018.02); *G06F 9/44505* (2013.01)

(58) Field of Classification Search
CPC .......... G06F 9/52–548; G06F 9/44505; G06F 9/45504–45508; G06F 8/656; G06F 8/71; G06F 3/038; G06F 3/04817; G06F 3/04842
See application file for complete search history.

(56) References Cited

U.S. PATENT DOCUMENTS

| | | | | |
|---|---|---|---|---|
| 7,784,031 B1 * | 8/2010 | Borg | .................. | G06F 9/44505 717/121 |
| 10,282,307 B1 * | 5/2019 | Escriva | ...................... | G06F 9/52 |
| 10,496,532 B1 * | 12/2019 | Kaitha | ................ | G06F 11/3419 |
| 10,782,883 B1 * | 9/2020 | Henning | ............... | G06F 3/0605 |
| 10,908,971 B1 * | 2/2021 | Gonzalez | .................. | G06F 8/41 |
| 2008/0098379 A1 * | 4/2008 | Newman | ............. | G06F 9/44505 717/168 |

(Continued)

OTHER PUBLICATIONS

Configurations Everywhere: Implications for Testing and Debugging in Practice Dongpu Jin, Xiao Qu, Myra B. Cohen (Year: 2014).*

(Continued)

*Primary Examiner* — April Y Blair
*Assistant Examiner* — Paul V Mills
(74) *Attorney, Agent, or Firm* — Sterne, Kessler, Goldstein & Fox P.L.L.C.

(57) ABSTRACT

Provided herein are system, method, and/or computer program product embodiments and/or combinations and sub-combinations thereof for updating configuration settings during the execution of an application. In a given embodiment, a central system may read a configuration value for a configuration setting of an application from a configuration file. The central system may assign the configuration value to a variable corresponding to the configuration setting. The central system may execute an operation on the variable corresponding to the configuration setting to change the variable to a new configuration value, independent of multiple threads executed by the application, while the application is being executed, and independent of the value of the configuration setting in the configuration file.

20 Claims, 5 Drawing Sheets

(56) References Cited

U.S. PATENT DOCUMENTS

| | | | | |
|---|---|---|---|---|
| 2010/0229160 | A1* | 9/2010 | Ishizaki | G06F 8/458 717/136 |
| 2011/0219361 | A1* | 9/2011 | Dolby | G06F 8/456 717/136 |
| 2015/0370598 | A1* | 12/2015 | Bailey | G06F 9/44505 718/100 |
| 2016/0011992 | A1* | 1/2016 | Sandoz | G06F 12/1458 711/163 |
| 2016/0087855 | A1* | 3/2016 | Vlachogiannis | H04L 67/34 709/223 |
| 2017/0139725 | A1* | 5/2017 | Koufogiannakis | G06F 9/44505 |
| 2020/0285456 | A1* | 9/2020 | Kumar | G06F 11/26 |
| 2020/0295983 | A1* | 9/2020 | Watanabe | G06F 3/0482 |
| 2020/0372531 | A1* | 11/2020 | Kesiboyana | G06F 21/53 |
| 2021/0141783 | A1* | 5/2021 | Lucas | G06Q 10/10 |
| 2021/0208907 | A1* | 7/2021 | Preston | G06Q 50/22 |
| 2021/0240923 | A1* | 8/2021 | Martinov | G06F 3/0482 |

OTHER PUBLICATIONS

Dynamically reconfigure your Java applications—Dynamic configuration lets you reconfigure your Java apps—while they're running Thomas E. Davis (Year: 1999).*

A Portable Grid-Enabled Computing System for a Nuclear Material Study Yuichi Tsujita, Tatsumi Arima (Year: 2010).*

Providing an Efficient Lockless Hash Table for Multi-Core Reachability in Java Bas van den Brink (Year: 2014).*

Advances in Digital Forensics Chapter 9: Reconstructing Tabbed Browser Sessions Using Metadata Associations Sriram Raghavan and S.V. Raghavan (Year: 2016).*

The search for the Goldilocks browser and why Firefox might be "just right" for you Ryan Pollock medium.com/mozilla-tech/the-search-for-the-goldilocks-browser-and-why-firefox-may-be-just-right-for-you-1f520506aa35 (Year: 2017).*

An Architecture for a Policy-Oriented Web Browser Management System: HiFiPol: Browser Ananth A. Jillepalli and Daniel Conte de Leon (Year: 2016).*

Firefox—PrefAPI (prefapi.h and prefapi.cpp) source code Mozilla; Commit#: e004ec8 github.com/mozilla/gecko-dev/blob/041e66aa0e2788827a2382cdabab2a18c564b510/modules/libpref/src/prefapi.h (Year: 2013).*

SharedPreferences.Editor Android Platform Developer API Reference web.archive.org/web/20191228091639/https://developer.android.com/reference/android/content/SharedPreferences.Editor (Year: 2019).*

Android Wifi Service source code excerpts WifiConfigStore.java, li. 1-1141; WifiStateMachine.java, li. 1-253 and 1255-1473 commit#: a8647b8cb29de22765062714cb265247234c3d32android.googlesource.com/platform/frameworks/opt/net/wifi/+/a8647b8cb29de22765062714cb265247234c3d32 (Year: 2015).*

The Java Tutorials—Atomic Variables Oracle web.archive.org/web/20120607080422/https://docs.oracle.com/javase/tutorial/essential/concurrency/atomicvars.html (Year: 2012).*

Java Concurrency in Practice Brian Goetz, Tim Peierls, Joshua Bloch, Joseph Bowbeer, David Holmes, Doug Lea Addison-Wesley Professional; ISBN-10: 0-321-34960-1 (Year: 2006).*

BeatMaster Documentation Eamonn F. Martin, Version 2.1 Retrieved: doc.gold.ac.uk/eamonn/software/BeatMaster/info.html (Year: 1998).*

Sharing appsettings.json configuration files between projects in asp.net Core Andrew Lock Retrieved: andrewlock.net/sharing-appsettings-json-configuration-files-between-projects-in-asp-net-core/ (Year: 2018).*

EMAV: Otoacoustic Emission Averager Stephen Neely and Zhiqiang Liu Technical Memorandum 17; Boys Town National Research Hospital (Year: 2015).*

Winston README.md Author: Charlie Robbins; Contributors: Jarrett Cruger, David Hyde, Chris Alderson GitHub documentation; commit 3d07a80 https://github.com/winstonjs/winston/blob/3d07a80a52f5c1df0f3a7823d7c08a350a30ac58/README.md (Year: 2020).*

* cited by examiner

METHOD AND SYSTEM FOR UPDATING CONFIGURATION SETTINGS DURING THE EXECUTION OF AN APPLICATION

BACKGROUND

Developers use configuration files to initialize parameters and settings for applications executed in a multi-threaded environment. The configuration includes variables storing values for the corresponding parameters and settings for the applications. Each of the variables is labeled as a final variable so that the variables are not modifiable and consequently thread-safe during the execution of the applications. Conventionally, the configuration files are read at the time of execution of the applications, and modifications to the variables included in the configuration file can only be captured by the application upon re-execution of the applications.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof for updating configuration settings during the execution of an application.

As described above, a configuration file (or config file) is used to initialize parameters and settings for applications in a multi-threaded environment. Different threads of the environment access these parameters and settings while being executed to perform their respective operations. The configuration file includes variables (or data structures) storing values for the parameters and settings for the applications. The variables are set as final variables so that threads are unable to modify the variables while being executed, to ensure consistency and data integrity. The configuration file is read to memory at the time of execution of the applications, and the applications access the values of the parameters and settings read from memory while being executed. Conventionally, updates to the parameters and settings included in the configuration file required a restart or re-execution of the applications. This can be time-consuming and inefficient.

In a given embodiment, a central system may read a configuration value for a configuration setting of an application from a configuration file, in response to the execution of the application. The application may execute multiple threads. The central system may store the configuration value of the configuration setting in memory and assign the configuration value to a variable, corresponding to the configuration setting. The variable may be a final variable configured to support atomic operations. The central system may receive a request from a user interface to change the variable to a new configuration value, while the application is being executed. The central system may execute an operation on the variable corresponding to the configuration setting to change the variable to the new configuration value, independent of the multiple threads executed by the application, while the application is being executed, and independent of the value of the configuration setting in the configuration file. The executed application can access the updated value of the configuration setting while being executed.

The above configuration allows for updating the configuration settings of an application while the application is being executed. This eliminates the need to restart or re-execute the application to capture the updated configuration settings. Furthermore, the disclosed system maintains the consistency and integrity of the data by setting the variables storing the values of the configuration settings as "FINAL." However, the variables are also configured to perform operations atomically so that an update to a value of a configuration setting does not affect the consistency of the configuration setting or other configuration settings.

Figure 1:
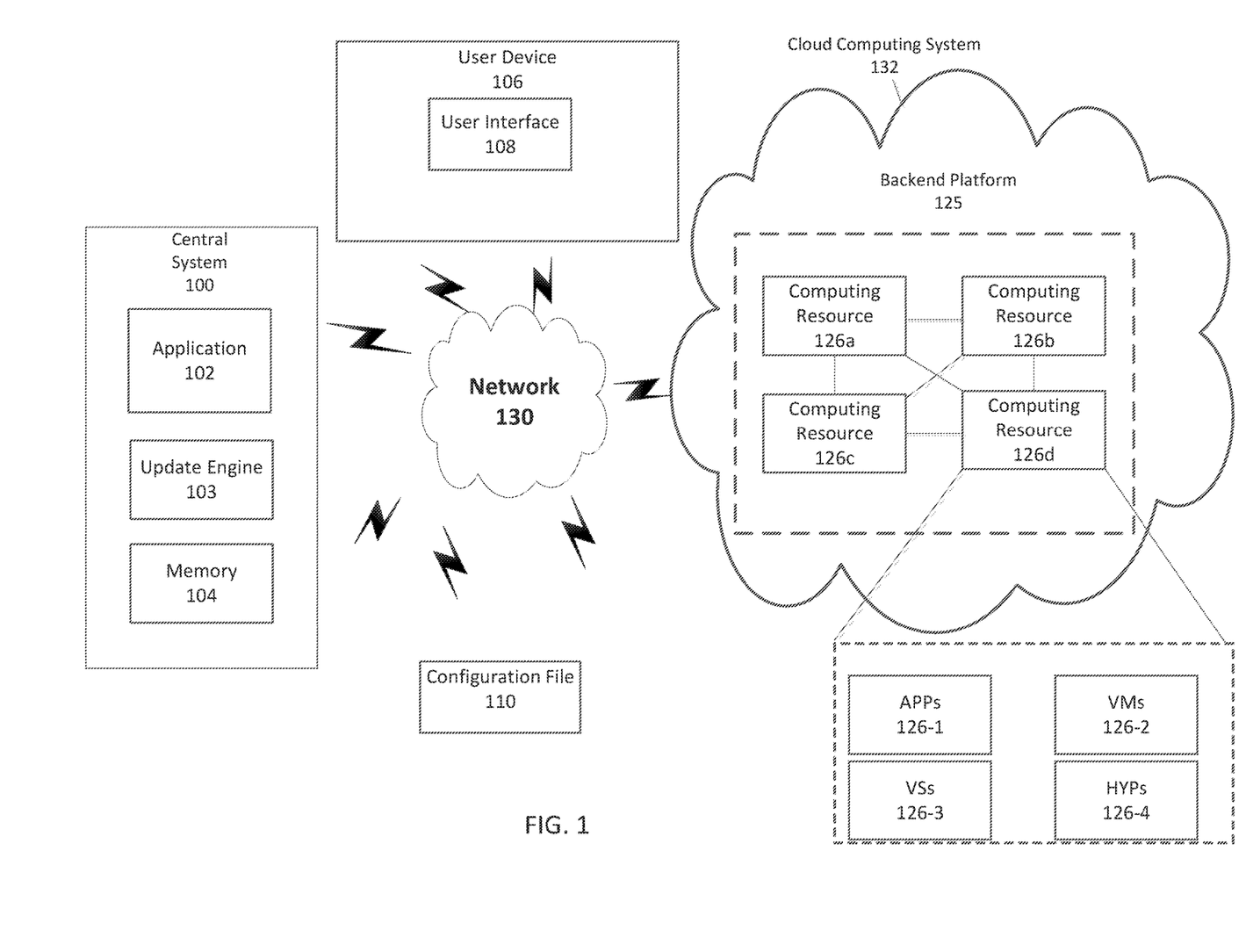
FIG. 1 is a block diagram of an example environment in which systems and/or methods described herein may be implemented according to an example embodiment.

FIG. 1 is a block diagram of an example environment in which systems and/or methods described herein may be implemented according to an example embodiment. The environment may include a central system 100, a user device 106, configuration file 110, a cloud computing system 132, and a network 130. The devices of the environment may be connected through wired connections, wireless connections, or a combination of wired and wireless connections.

In an example embodiment, one or more portions of the network 130 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 125 may include one or more devices configured to host applications such as application 102 and update engine 103. The backend platform 125 may include a server or a group of servers. In an embodiment, the backend platform 125 may be hosted in a cloud computing system 132. It may be appreciated that the backend platform 125 may not be cloud-based, or may be partially cloud-based.

The central system 100 and configuration file 110 may include one or more devices configured to interface with the backend platform 125. In an embodiment, the central system 100 may execute application 102. The central system 100 and configuration file 110 may reside fully or partially in the cloud computing system 132. Alternatively, central system 100, and configuration file 110 may reside outside the cloud computing system 132.

In an embodiment, the central system 100 may include application 102 and system memory 104. User device 106 may interface with the central system 100 to manage the execution of the application 102. User device 106 may also interface the central system 100 using a user interface 108. The configuration file 110 may reside in a data storage device such as a database or data repository. The central system 100 may interface with the configuration file 110 for executing the application 102.

The cloud computing system 132 includes an environment that delivers computing as a service, whereby shared resources, services, etc. may be provided to the user device 1940 and/or the backend platform 125. The cloud computing system 132 may provide computation, software, data access, storage, and/or other services that do not require end-user knowledge of a physical location and configuration of a system and/or a device that delivers the services. The cloud computing system 132 may include computing resources 126*a-d*.

Each computing resource 126*a-d* includes one or more personal computers, workstations, computers, server devices, or other types of computation and/or communication devices. The computing resource(s) 126*a-d* may host the backend platform 1925. The cloud resources may include compute instances executing in the computing resources 126*a-d*. The computing resources 126*a-d* may communicate with other computing resources 126*a-d* via wired connections, wireless connections, or a combination of wired or wireless connections.

Computing resources 126*a-d* may include a group of cloud resources, such as one or more applications ("APPs") 126-1, one or more virtual machines ("VMs") 126-2, virtualized storage ("VS") 126-3, and one or more hypervisors ("HYPs") 126-4.

Application 126-1 may include one or more software applications that may be provided to or accessed by the central system 100 or user device 106. In an embodiment, application 102 and update engine 103 may be executed locally on the central system 100. Alternatively, application 102 and update engine 103 may be executed on the cloud computing system 132.

The application 126-1 may eliminate a need to install and execute software applications on the central system 100. The application 126-1 may include software associated with backend platform 125 and/or any other software configured to be provided across the cloud computing system 132. The application 126-1 may send/receive information from one or more other applications 126-1, via the virtual machine 126-2.

Virtual machine 126-2 may include a software implementation of a machine (e.g., a computer) that executes programs like a physical machine. Virtual machine 126-2 may be either a system virtual machine or a process virtual machine, depending upon the use and degree of correspondence to any real machine by virtual machine 126-2. A system virtual machine may provide a complete system platform that supports the execution of a complete operating system (OS). A process virtual machine may execute a single program and may support a single process. The virtual machine 126-2 may execute on behalf of a user and/or on behalf of one or more other backend platforms 125 and may manage the infrastructure of cloud computing system 132, such as data management, synchronization, or long-duration data transfers.

Virtualized storage 126-3 may include one or more storage systems and/or one or more devices that use virtualization techniques within the storage systems or devices of computing resource 126*a-d*. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file-level and location where files are physically stored. This may enable optimization of storage use, server consolidation, and/or performance of non-disruptive file migrations.

Hypervisor 126-4 may provide hardware virtualization techniques that allow multiple operations systems (e.g., "guest operating systems") to execute concurrently on a host computer, such as computing resource 126*a-d*. Hypervisor 126-4 may present a virtual operating platform to the guest operating systems and may manage the execution of the guest operating systems multiple instances of a variety of operating systems and may share virtualized hardware resources.

In an embodiment, user device 106 may interface with the central system 100 to execute application 102. Alternatively, the central system 100 may execute application 102 based on requests from other devices or services. Application 102 may be an executable application, including source code for executing multiple threads. Application 102 may be configured to execute on the central system 100 or cloud computing system 132. User device 106 may specify a configuration file 110 for executing the application 102. Alternatively, the configuration file 110 may be specified within the source code of application 102. Configuration file 110 may store the configuration settings for the application 102. The configuration settings may have corresponding configuration values. These configuration values may be necessary for the various threads of application 102, to complete their respective tasks. Central system 100 may read the configuration values from configuration file 110 into system memory 104 and execute the application 102. The threads of application 102 may access the configuration values from system memory 104 while being executed.

The configuration values included in the configuration file 110 may be stored in data structures. The data structures may be strings, integers, arrays, lists, Boolean, stacks, and the like. The data structures storing the values of the configuration values may be assigned to variables (e.g., final boolean variableName). Each variable may correspond to a configuration setting. The variables may be final variables. Once a final variable has been assigned, it always contains/will refer to the same value. This way, the different threads do not alter the value of the variables while being executed. These variables may be configured to support atomic operations. Atomic operations are operations that are executed independently of any other processes. For example, the variables may be defined as atomic final variables. In this regard, the atomic final variables are configured to support operations without affecting any other variable or thread. As a non-limiting example, atomic operations may include get( ) which retrieves the value of a given variable from memory (e.g., variableName.get( )); or set( ), which sets a value of a given variable to memory (e.g., variableName.set (value)).

The variables storing the configuration values may be read into system memory 104, upon execution of application 102. A user may desire to update a variable corresponding to a configuration setting to a new configuration value, while the application 102 is being executed. The user may access user interface 108 on user device 106. A user may attempt to interface with user interface 108 to update a value of a configuration setting while an application is being executed, using user device 106. The user may provide a username and password to access the user interface. The username and password may be transmitted from user device 106. The central system may authenticate the user using the username and password.

In response to authenticating the user, the central system generates and displays user interface 108 on user device 106. This prevents users from changing configuration parameters or settings without the necessary authorization to do so.

The user may input the desired changes to the variable corresponding to the configuration setting on user interface 108, using user device 106. User interface 108 may transmit a request to make the desired changes variable central system 100. The request may be an HTTP request. The request may include an identifier of the variable and the new (desired) configuration value. The identifier may be the variable name storing the value of the parameter.

Update engine 103 may receive the request to update the identified variable to be updated to the new configuration value. Update engine 103 may execute an operation on the variable corresponding to the configuration setting to change the variable to the new configuration value, independent of the plurality of threads executed by the application, while the application is being executed, and independent of the value of the configuration setting in the configuration file. By doing so, update engine 103 changes the current configuration value of the assigned to the variable to the new configuration value in system memory 104. The threads of application 102 may access the new configuration value of the identified variable from system memory 104, while application 102 is being executed.

User interface 108 may receive a response indicating a status of the request. The status may be a confirmation message indicating the configuration setting has been updated to the new configuration value. Alternatively, the status may be a failure message indicating that the configuration setting was unable to be changed. The response may be rendered on the user interface.

In some embodiments, central system 100 may receive a request to change a set of variables corresponding to different configuration settings to a set of new configuration values from user interface 108. Update engine 103 may execute an operation on each of the set of variables to change the set of variables to the configuration value in parallel, independent of the plurality of threads executed by application 102, while application 102 is being executed, and independent of the configuration values of the different configuration settings in the configuration file.

Figure 2:
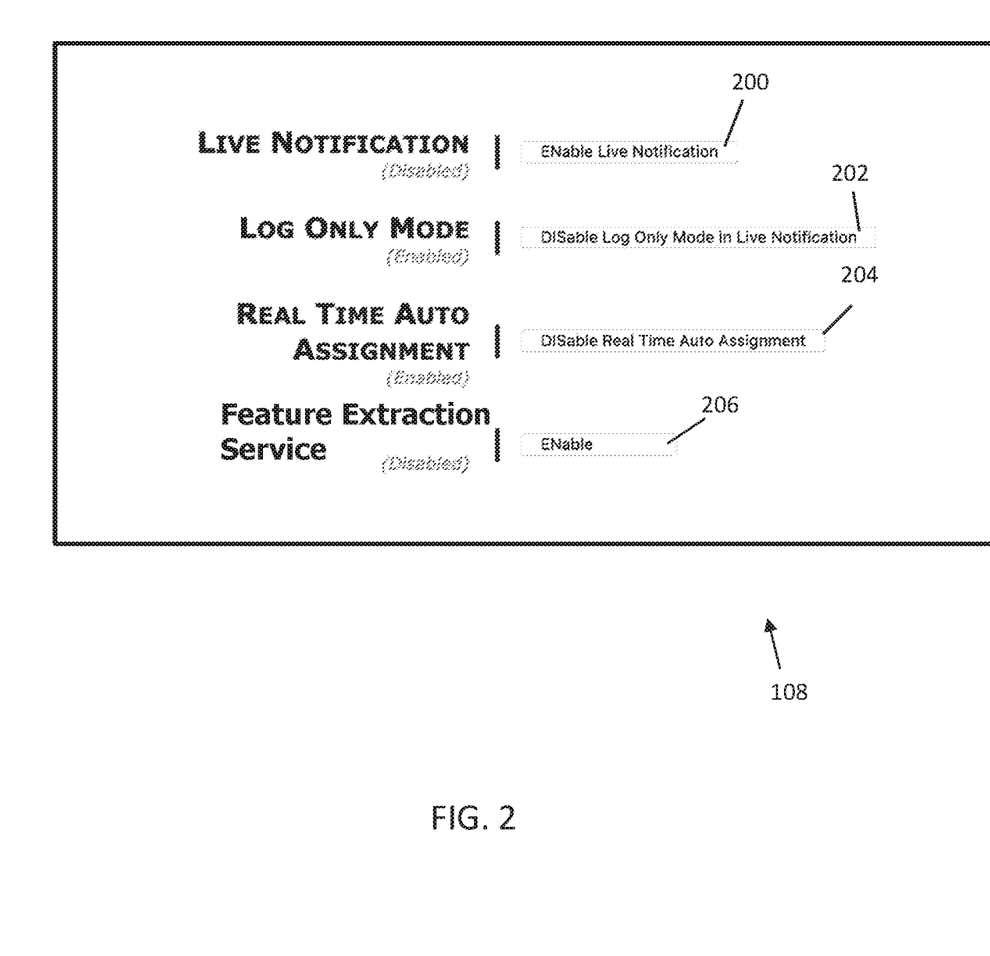
FIG. 2 is a block diagram of an example user interface according to an example embodiment.

FIG. 2 is a block diagram of an example user interface 108, according to an example embodiment. User interface 108 may display user input elements 200-206. Each of user input element corresponds with a variable stored in the system memory. Each variable corresponds with a configuration setting. As such, each of the user interface input elements 200-206 may be used to change a corresponding variable to a new configuration value. The user interface input elements 200-202 may be a button, text box, dropdown, or the like.

Each user interface input element 200-206 may be encoded with the corresponding variable's identifier. User interface 108 may receive an input with respect to user interface input element 200-206. In response to receiving the input, user interface 108 may generate a request including an instruction to execute the operation on a variable to change the variable to the new configuration value, independent of the multiple of threads executed by the application, while the application is being executed, and independent of the value of the configuration setting in the configuration file. The request may be transmitted to the central system. The request may be an HTTP/HTTPS request. The central system may change the variable to the new configuration value, in response to receiving the request, as described above.

As a non-limiting example, user interface 108 may include user interface input elements: live notification, log only mode, real-time auto-assignment, and feature extraction service. Each of the user interface input elements 200-206 may correspond with a variable, which corresponds with a configuration setting. Therefore, user interface input element 200 may correspond with a live notification configuration setting, user interface input element 202 may correspond with a log only mode configuration setting, user interface input element 204 may correspond with a real-time auto-assignment configuration setting. The feature extraction service is a learning algorithm for unsupervised feature extraction, and user interface input element 206 may correspond with a feature extraction service configuration setting.

The feature extraction service is configured to analyze noisy and high-dimensional datasets. Another example, the feature extraction service is a stack trace assignment service. The stack trace is a report of active stack frames during the execution of an application. Each of these user interface input elements 200-206 have two possible values, enabled or disabled. Accordingly, the corresponding inputs for these parameters or settings are buttons. However, various parameters or settings may have more than two possible values. In this regard, as described above, the user interface input elements may be input boxes, dropdown menus, or the like.

User interface input elements 200-206 may indicate the current value of the corresponding values. For example, user interface 108 indicates that the live notification configuration setting is disabled, log only mode is enabled, real-time auto-assignment is enabled, and the feature extraction service is disabled. Therefore, a user may enable the live notification setting by providing input with respect to user interface element 200 (e.g., selecting a button). Furthermore, a user may disable log only mode by providing input with respect to user interface element 202. Additionally, a user may disable real-time auto-assignment by providing input with respect to user interface element 204, and a user may enable the feature extraction service by providing input with respect to user interface element 206.

As an example, in response to selecting user interface element 202 corresponding to the log only mode configuration setting, user interface 108 may generate a request. The log only mode provides for logging any notifications generated during the execution of the application, in a log file rather than providing a live notification. The request may include an instruction to change the variable corresponding to the log mode only configuration setting to a new configuration value of "disabled." The request may be transmitted to the central system. The request may include the current value of the log only mode setting (e.g., enabled), the new desired value of the log only mode (e.g., disabled), and an identifier of the log only mode (e.g., final Boolean isLogOnlyMode).

The update engine on the central system may receive the request. The update engine may confirm the current value of the log only mode setting. For example, the update engine may execute the following line of code to retrieve the current value of the log only mode setting: isLogOnlyModeEnabeled.get( ). In response to executing this line of code, the update engine will retrieve the value of the log only mode setting from the system memory. In the event, log only mode is enabled, the update engine will receive a value indicating "true" from the system memory. In response to this line of code returning "true," the update engine will confirm that the log only mode is enabled. The update engine may execute the following line of code to disable the log only mode setting: isLogOnly mode .set(false). In response to executing this line of code, the update engine will update the value of the log only mode setting to "false" in the system memory. In this regard, the log only mode setting will be disabled.

As another example, the update engine may execute the following line of code to confirm and update the value of the log only mode setting: isLogOnlyModeEnabeled.compareAndSet(true, false). This line of code first confirms the log only mode setting is disabled (i.e., the value is set to true), and if this is confirmed, updates the value to disable the log only mode setting (e.g., updates the value to false).

As a result, the variable corresponding to the log only mode configuration setting may be updated to the new configuration value of "disabled." The variable may be changed to the new configuration setting without affecting the multiple threads being executed by the application, while the application is being executed, and without affecting the configuration value of the configuration setting in the configuration file. Therefore, the variable is changed to the new configuration value without restarting the application. In response to changing the variable to the new configuration value of, "disabled," the multiple threads of the application may read the variable with the new configuration value from memory while being executed. Furthermore, a success message may be displayed on user interface 108.

Figure 3:
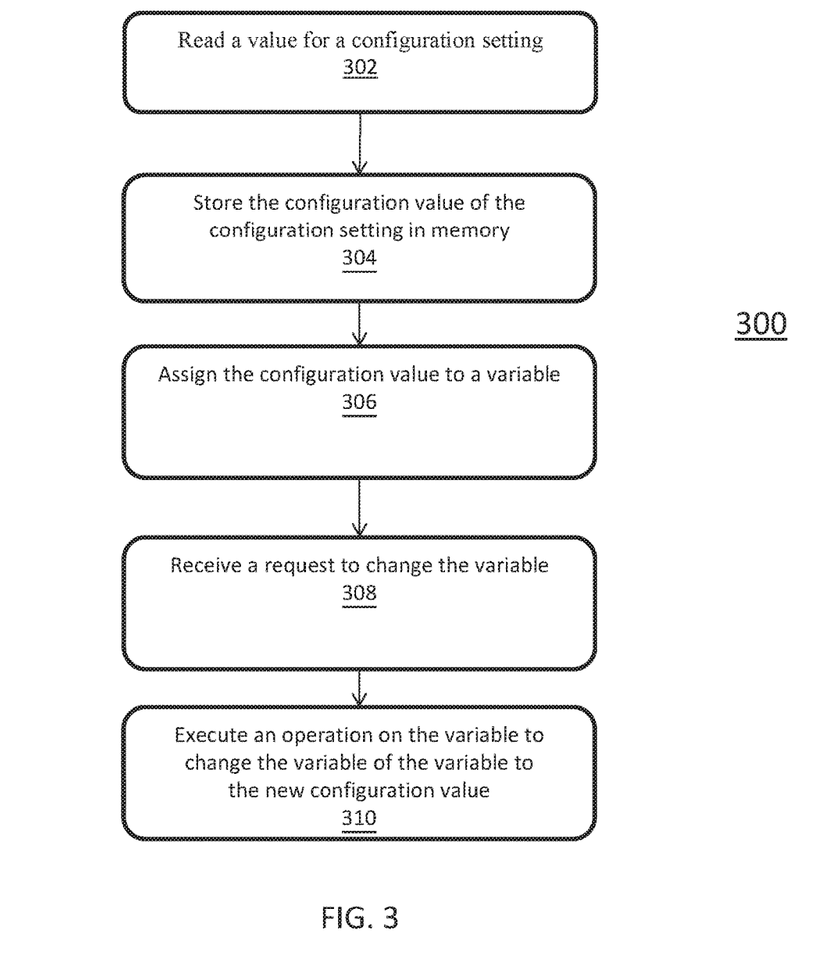
FIG. 3 is a flowchart illustrating the process for updating configuration settings during the execution of an application according to an example embodiment.

FIG. 3 is a flowchart illustrating the process for updating configuration settings during the execution of an application according to an example embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously or in a different order than shown in FIG. 3, as will be understood by a person of ordinary skill in the art.

Method 300 shall be described with reference to FIG. 1. However, method 300 is not limited to that example embodiment.

In 302, a central system reads a configuration value for a configuration setting of an application from a configuration file, in response to the execution of the application. The central system application executes the application using the configuration settings of the application in the configuration file. The configuration file may be stored in a configuration file repository. The configuration file may be specific to the application. The application executes multiple threads.

In 304, the central system stores the configuration value of the configuration setting in memory of the central system. The values of all of the configuration settings for the application are stored in memory. The configuration settings may be read from memory while the application is being executed.

In 306, the central system assigns the configuration value of the configuration setting to a variable corresponding to the configuration setting. The variable may be a final variable configured to support atomic operations. The value may be stored in a data structure such as an integer, string, Boolean, or the like. The variable is labeled as final so that the multiple threads do not change the value of the configuration setting.

In 308, the central system may receive a request to change the value of the variable to a new configuration value, while the application is being executed. The request may be received from a user interface. The request may include the new value and an identifier of the final variable corresponding to the configuration setting to be updated. The user interface may include inputs such as buttons, text boxes, dropdown menus, or the like, to select the new value.

In 310, the central system executes an operation on the variable corresponding to the configuration setting to change the variable to the new configuration value, independent of the plurality of threads executed by the application, while the application is being executed, and independent of the value of the configuration setting in the configuration file. As an example, the operation to update the may be final variableName.set(new value). That is, the value of the configuration setting is updated in memory so that while the application is being executed, the application can access the updated value in memory. The central system may generate a response once the configuration setting has been updated. The central system may transmit this response to the user device. The response may be rendered on the user interface.

Figure 4:
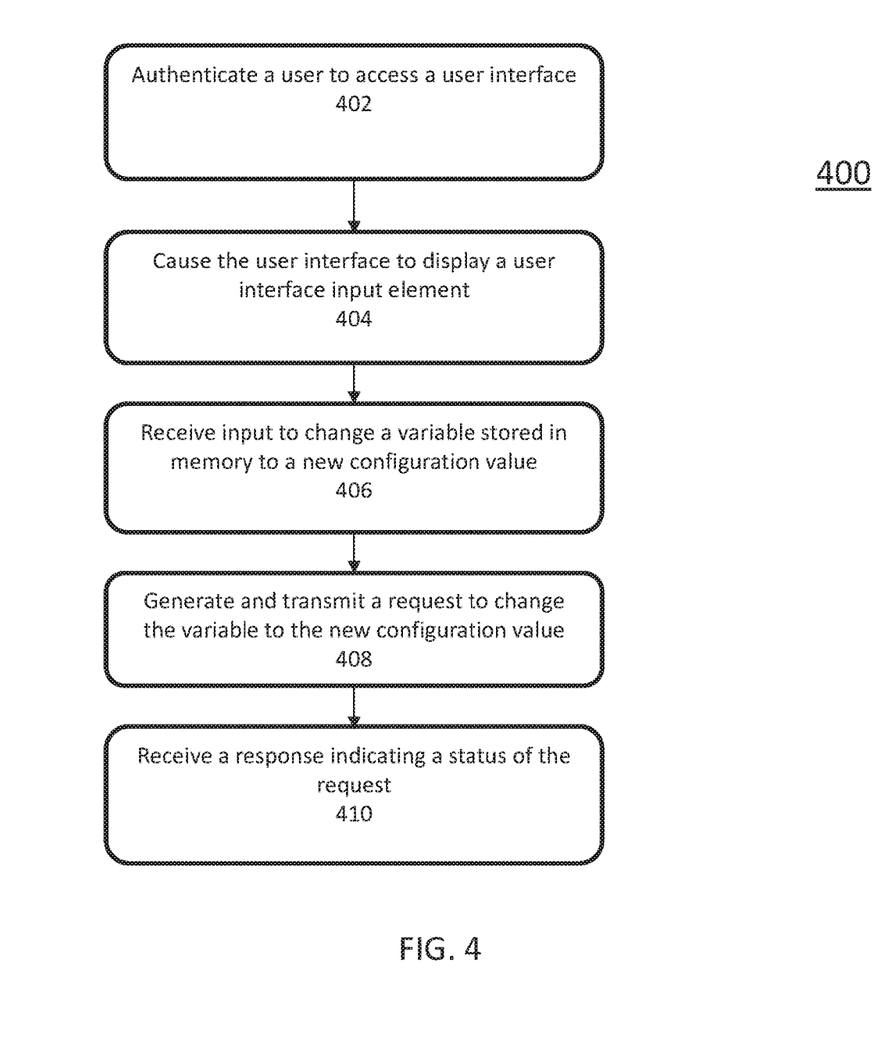
FIG. 4 is a flowchart illustrating the process for updating configuration settings during the execution of an application according to an example embodiment.

FIG. 4 is a flowchart illustrating the process for transmitting a request to change a configuration setting during the execution of an application according to an example embodiment.

Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIG. 1. However, method 400 is not limited to that example embodiment.

In 402, the central system authenticates a user to access a user interface for changing configuration settings of an application, while the application is being executed. For example, the user may use the user device to attempt to access the user interface. The user may provide a username and password to access the user interface. The central system may authenticate the user using the username and password.

In 404, the central system causes the user interface to display a user interface input element corresponding to the variable. The user interface input element may be a text box, button, dropdown menu, or the like. The user interface input element may be encoded with an identifier of the variable.

In 406, the user interface receives input to change a variable stored in memory to a new configuration value. The user interface may provide inputs such as a button, text box, dropdown menu, or the like, for receiving inputs from a user. The user may provide input to change a single configuration setting or may provide multiple inputs to change multiple configuration settings. The user may submit the desired changes.

In 408, the user interface generates and transmits a request including an instruction to execute the operation on the variable to change the variable to the new configuration value, independent of the plurality of threads executed by the application, while the application is being executed, and independent of the value of the configuration setting in the configuration file. The request may include the new value of the configuration setting and the identifier of the variable. The request may be an HTTP/HTTPS request.

In 410, the user interface may receive a response indicating a status of the request. The status may be a confirmation message indicating the variable has been updated to the new configuration value. Alternatively, the status may be a failure message indicating that the variable was not updated. The response may be rendered on the user interface.

Figure 5:
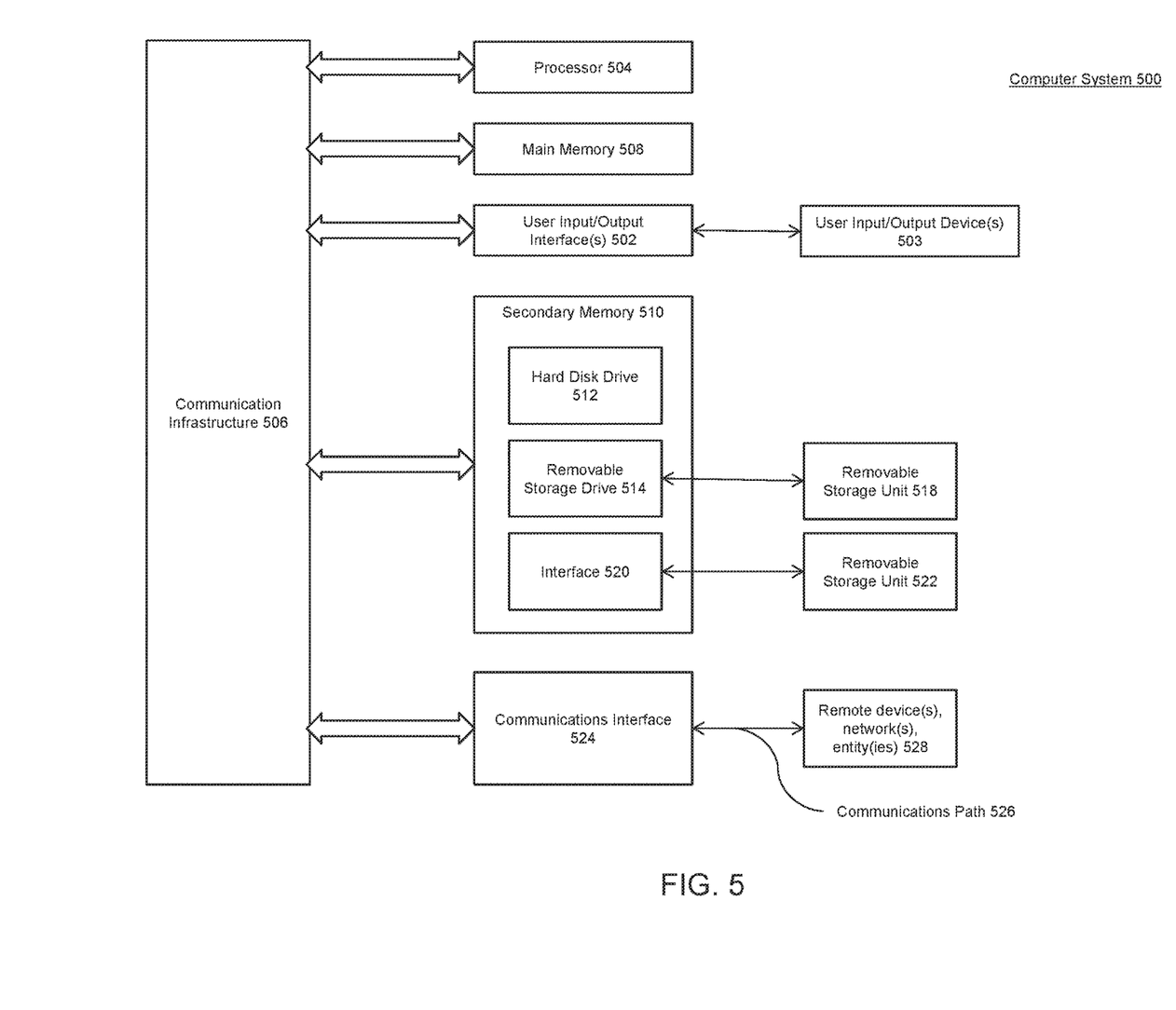
FIG. 5 is a block diagram of example components of a computing system according to an embodiment.

FIG. 5 is a block diagram of example components of computer system 500. One or more computer system 500 may be used, for example, to implement any of the embodiments discussed herein, as well as combinations and sub-combinations thereof. Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 308, such as random access memory (RAM). Main memory 508 may include one or more levels of cache. Main memory 308 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514.

Removable storage drive 514 may interact with a removable storage unit 518. Removable storage unit 518 may include a computer-usable or readable storage device having stored thereon computer software (control logic) and/or data. Removable storage unit 518 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

The breadth and scope of the present disclosure should not be limited by any of the above-described exemplary embodiments but should be defined only in accordance with the following claims and their equivalents.

What is claimed is:

1. A computer-implemented method, comprising:
responsive to an execution of an application, reading, by one or more processors, a configuration value of a configuration setting of the application from a configuration file, wherein the application is one of a plurality of applications in a multi-threaded environment, and wherein the application executes a plurality of threads, and wherein the configuration setting specifies a log-only-mode setting and the application uses the log-only-mode setting to determine whether to log a notification in a log file or provide the notification to a user as a live notification;

assigning the configuration value of the configuration setting to a variable corresponding to the configuration setting, the variable stored in a system memory in a central system and marked as final to prevent modification by a thread in the plurality of threads;

during the execution of the application, receiving a web request to change the variable to a new configuration value; and responsive to the web request and during the execution of the application, executing an atomic operation on the variable to change the variable to the new configuration value independent of the configuration value of the configuration setting in the configuration file, wherein the plurality of threads of the application use the variable having the new configuration value during a remainder of the execution of the application by referencing the variable in the system memory at the central system.

2. The method of claim 1, wherein a user interface input element corresponding to the variable is displayed on a user interface.

3. The method of claim 2, further comprising:

receiving an input with respect to the user interface input element, on the user interface, indicating the new configuration value; and generating an instruction to execute the atomic operation on the variable to change the variable to the new configuration value based on the web request.

4. The method of claim 1, further comprising:

receiving a new request to change a set of variables to a set of new configuration values; and executing a new atomic operation on each variable of the set of variables to change the set of variables to the set of new configuration values in parallel, independent of the plurality of threads executed by the application.

5. The method of claim 1, wherein the web request includes an identifier of the variable and the new configuration value.

6. The method of claim 1, the receiving the web request further comprising:

authenticating the user with a login and password; and responsive to the authenticating, granting access to a user interface that allows the user to generate the web request.

7. The method of claim 1, wherein the atomic operation is a set( ) operation.

8. A system comprising:

a memory; and at least one processor coupled to the memory, the at least one processor configured to:

responsive to an execution of an application, read a configuration value of a configuration setting of the application from a configuration file, wherein the application is one of a plurality of applications in a multi-threaded environment, wherein the application executes a plurality of threads, and wherein the configuration setting specifies a log-only-mode setting and the application uses the log-only-mode setting to determine whether to log a notification in a log file or provide the notification to a user as a live notification;

assign the configuration value of the configuration setting to a variable corresponding to the configuration setting, the variable stored in a system memory in a central system and marked as final to prevent modification by a thread in the plurality of threads;

during the execution of the application, receive a web request to change the variable to a new configuration value; and responsive to the web request and during the execution of the application, execute an atomic operation on the variable to change the variable to the new configuration value independent of the configuration value of the configuration setting in the configuration file, wherein the plurality of threads of the application use the variable having the new configuration value during a remainder of the execution of the application by referencing the variable in the system memory at the central system.

9. The system of claim 8, the at least one processor further configured to cause a display of a user interface input element corresponding to the variable on a user interface.

10. The system of claim 9, the at least one processor further configured to:

generate an instruction to execute the atomic operation on the variable to change the variable to the new configuration value based on the web request, wherein an input received on the user interface input element indicates the new configuration value.

11. The system of claim 8, the at least one processor further configured to:

receive a new request to change a set of variables to a set of new configuration values; and execute a new atomic operation on each variable of the set of variables to change the set of variables to the set of new configuration values in parallel, independent of the plurality of threads executed by the application.

12. The system of claim 8, wherein the web request includes an identifier of the variable and the new configuration value.

13. The system of claim 8, wherein to receive the web request the at least one processor is further configured to:

authenticate the user with a login and password; and responsive to the authenticating, grant access to a user interface that allows the user to generate the web request.

14. The system of claim 8, wherein the atomic operation is a set( ) operation.

15. A non-transitory computer-readable medium having instructions stored thereon, execution of which, by one or more processors of a device, cause the one or more processors to perform operations comprising:

responsive to an execution of an application, reading a configuration value of a configuration setting of the application from a configuration file, wherein the application is one of a plurality of applications in a multi-threaded environment, wherein the application executes a plurality of threads, and wherein the configuration setting specifies a log-only-mode setting and the application uses the log-only-mode setting to determine whether to log a notification in a log file or provide the notification to a user as a live notification;

assigning the configuration value of the configuration setting to a variable corresponding to the configuration setting, the variable stored in a system memory in a central system and marked as final to prevent modification by a thread in the plurality of threads;

during the execution of the application, receiving a web request to change the variable to a new configuration value; and responsive to the web request and during the execution of the application, executing an atomic operation on the variable to change the variable to the new configuration value independent of the configuration value of the configuration setting in the configuration file, wherein the plurality of threads of the application use the variable having the new configuration value during a remainder of the execution of the application by referencing the variable in the system memory at the central system.

16. The non-transitory computer-readable medium of claim 15, the operations further comprising displaying a user interface input element corresponding to the variable on a user interface.

17. The non-transitory computer-readable medium of claim 16, the operations further comprising:

receiving an input with respect to the user interface input element, on the user interface, indicating the new configuration value; and generating an instruction to execute the atomic operation on the variable to change the variable to the new configuration value based on the web request.

18. The non-transitory computer-readable medium of claim 15, the operations further comprising:

receiving a new request to change a set of variables to a set of new configuration values; and executing a new atomic operation on each variable of the set of variables to change the set of variables to the set of new configuration values in parallel, independent of the plurality of threads executed by the application.

19. The non-transitory computer-readable medium of claim 15, wherein the web request includes an identifier of the variable and the new configuration value.

20. The non-transitory computer-readable medium of claim 15, the operations further comprising:

authenticating the user with a login and password; and responsive to the authenticating, granting access to a user interface that allows the user to generate the web request.

* * * * *